(12) United States Patent
Lapinski et al.

(10) Patent No.: US 7,687,049 B2
(45) Date of Patent: Mar. 30, 2010

(54) APPARATUS AND PROCESS FOR REMOVAL OF CARBON MONOXIDE

(75) Inventors: Mark P. Lapinski, Aurora, IL (US); Richard R. Rosin, Glencoe, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/177,851

(22) Filed: Jul. 22, 2008

(65) Prior Publication Data

US 2010/0018906 A1 Jan. 28, 2010

(51) Int. Cl.
*B01D 53/94* (2006.01)
*C01D 3/06* (2006.01)

(52) U.S. Cl. ..................... 423/247; 423/182
(58) Field of Classification Search .......... None
See application file for complete search history.

(56) References Cited

U.S. PATENT DOCUMENTS

| | | | |
|---|---|---|---|
| 3,156,657 A | | 11/1964 | Pinder et al. |
| 3,962,140 A | * | 6/1976 | Alcorn et al. ............... 502/315 |
| 3,970,435 A | | 7/1976 | Schultz et al. |
| 4,172,817 A | | 10/1979 | Yates et al. |
| 4,298,459 A | * | 11/1981 | Tatterson et al. ....... 208/120.15 |
| 4,409,095 A | | 10/1983 | Peters |
| 4,964,889 A | * | 10/1990 | Chao ............................ 95/96 |
| 5,106,798 A | | 4/1992 | Fung |
| 5,106,800 A | | 4/1992 | Moser et al. |
| 5,256,612 A | | 10/1993 | Fung |
| 6,034,018 A | | 3/2000 | Sechrist et al. |
| 6,379,645 B1 | | 4/2002 | Bucci et al. |
| 6,881,391 B1 | | 4/2005 | Sechrist |
| 7,183,328 B2 | * | 2/2007 | Hershkowitz et al. ....... 518/709 |
| 2004/0175310 A1 | | 9/2004 | Feaviour et al. |
| 2004/0253168 A1 | * | 12/2004 | Chu ........................ 423/447.3 |
| 2005/0137443 A1 | | 6/2005 | Gorawara et al. |
| 2005/0193627 A1 | * | 9/2005 | Zhang et al. ............... 48/198.7 |
| 2006/0013763 A1 | | 1/2006 | Baird et al. |
| 2006/0013764 A1 | | 1/2006 | Baird et al. |
| 2006/0111456 A1 | | 5/2006 | Huang et al. |

FOREIGN PATENT DOCUMENTS

| | | |
|---|---|---|
| EP | 0515137 A1 | 11/1992 |
| JP | 10-176177 | 6/1998 |

(Continued)

OTHER PUBLICATIONS

Arteaga et al., FTIR Study of CO Adsorption on Coked Pt-Sn/Al2O3 Catalysts, Catalysis Letters, vol. 58(4), 1999, pp. 189-194.

(Continued)

*Primary Examiner*—Melvin C Mayes
*Assistant Examiner*—Sheng Han
(74) *Attorney, Agent, or Firm*—Maryann Maas

(57) ABSTRACT

One exemplary embodiment can be a process for lowering an amount of carbon monoxide in a stream rich in hydrogen. The process can include passing the stream rich in hydrogen through a carbon monoxide removal zone to produce a product stream having no more than about 10 vppm carbon monoxide and communicating the product stream to a reduction zone receiving a catalyst comprising unreduced metal species.

10 Claims, 1 Drawing Sheet

FOREIGN PATENT DOCUMENTS

| | | | |
|---|---|---|---|
| JP | 2002-066321 | | 3/2002 |
| JP | 2007165964 | * | 1/2007 |
| JP | 2007-252988 | | 10/2007 |
| JP | 2007-252989 | | 10/2007 |
| JP | 2007-252990 A | | 10/2007 |
| JP | 2007-260555 | | 10/2007 |
| WO | WO-02/00341 A2 | | 1/2002 |

OTHER PUBLICATIONS

Cusher, UOP Butamer Process and UOP Penex Process, Handbook of Petroleum Refining Processes, Volume Third Edition, 2003, pp. 9.7-9.27.

Echigo et al., CO Removal from Reformed Gas by Catalytic Methanation for Polymer Electrolyte Fuel Cell Applications, Journal of Chemical Engineering of Japan, vol. 37, No. 1, 2004, pp. 75-81.

Newson et al., High Selectivity Preferential Oxidation (PROX) Catalysts for CO Removal from HC Derived Reformates for PEM Fuel Cells, Studies in Surface Science and Catalysis, Science and Technology in Catalysts 2002, vol. 145, 2003, pp. 391-394.

Takenaka et al., Complete Removal of Carbon Monoxide in Hydrogen-Rich Gas Stream through Methanation over Supported Metal Catalysts, International Journal of Hydrogen Energy, vol. 29(10), Oct. 25, 2003, pp. 1065-1073.

* cited by examiner

APPARATUS AND PROCESS FOR REMOVAL OF CARBON MONOXIDE

FIELD OF THE INVENTION

This invention generally relates to an apparatus and a process for reducing a catalyst typically used in a reforming process.

DESCRIPTION OF THE RELATED ART

During the reforming of a hydrocarbon stream, such as naphtha, often a continuous catalyst regeneration reforming unit is utilized. In such a unit, a reduction zone may be provided to reduce the catalyst before the catalyst can enter a reforming reactor. If carbon monoxide is present in the reduction zone, higher coke may form on the catalyst in the reforming reactor. Generally, such carbon monoxide originates from the hydrogen stream used to reduce the catalyst. Typically, the hydrogen stream can contain about 5-about 20 volume parts-per-million (hereinafter may be abbreviated "vppm"), or even amounts up to about 100 vppm, particularly for hydrogen streams containing recycled hydrogen from reforming reactors operating at low pressures and high temperatures to maximize reformate yields.

Increased coking can be detrimental by lowering catalytic activity and decreasing selectivity of desired products. In addition, operating conditions may need to be changed resulting in reduced capacity. As an example, the feed rate may need to be lowered in order to increase the hydrogen:hydrocarbon ratio to mitigate the coke formation, which in turn can result in product and profitability losses. Alternatively, reforming reactor temperatures may be increased to compensate for activity loss due to coking, which in turn may produce even higher coke levels. Thus, it would be beneficial to provide a reforming process and/or unit with lower coke producing tendencies to reduce activity losses and maintain the desired product selectivities.

SUMMARY OF THE INVENTION

One exemplary embodiment can be a process for lowering an amount of carbon monoxide in a stream rich in hydrogen. The process can include passing the stream rich in hydrogen through a carbon monoxide removal zone to produce a product stream having no more than about 10 vppm carbon monoxide and communicating the product stream to a reduction zone receiving a catalyst comprising unreduced metal species.

Another exemplary embodiment can be an apparatus for removing carbon monoxide from a reducing gas stream. The apparatus can include a reduction zone for a continuous catalyst regeneration reforming unit, and a carbon monoxide removal zone in communication with the reduction zone.

A further exemplary embodiment may be a continuous catalyst regeneration reforming unit. Generally, the continuous catalyst regeneration reforming unit includes a reduction zone, a carbon monoxide removal zone, a reforming reaction zone, and a regeneration zone. The carbon monoxide removal zone can be in communication with the reduction zone to provide a product stream rich in hydrogen and having no more than about 10 vppm carbon monoxide. In addition, the reforming reaction zone can also be in communication with the reduction zone to receive a reduced catalyst. Furthermore, the regeneration zone may be in communication with the reforming reaction zone to receive a spent catalyst.

The embodiments disclosed herein can provide a process and an apparatus for reducing the levels of carbon monoxide in a reducing gas, such as hydrogen. As a result, coking of the catalyst can be minimized in a reforming reaction zone and thereby can improve operability.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the hydrocarbon molecule. The stream can include one or more gases, liquids, and/or solids.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount generally of at least about 50%, and preferably about 70%, by mole, of a compound or class of compounds in a stream.

As used herein, the term "substantially" can mean an amount generally of at least about 90%, preferably about 95%, and optimally about 99%, by mole, of a compound or class of compounds in a stream.

As used herein, the term "adsorption" can refer to the retention of a material in a bed containing an adsorbent by any chemical or physical interaction between the material in the bed, and includes, but is not limited to, adsorption and/or absorption. The removal of the material from an adsorbent may be referred to herein as "desorption."

DETAILED DESCRIPTION

Figure 1:
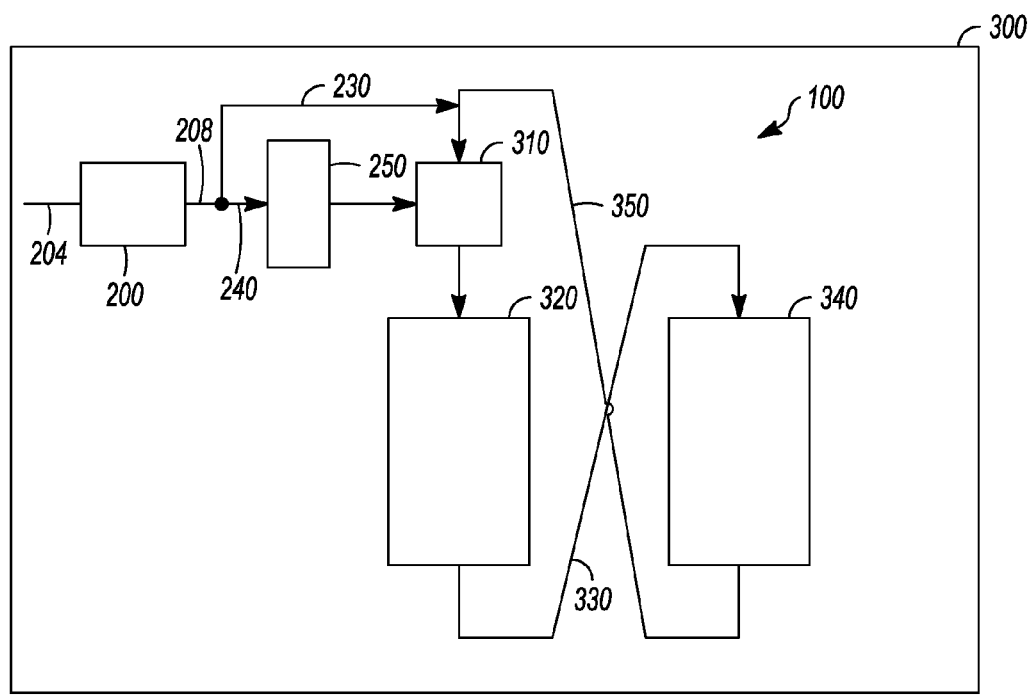
FIG. 1 is a schematic depiction of an exemplary apparatus for removing carbon monoxide within an exemplary continuous catalytic regeneration reforming unit.

Referring to FIG. 1, an exemplary apparatus 100 for removing carbon monoxide is depicted. The apparatus 100 can include a carbon monoxide removal zone 200 and a reduction zone 310. Generally, the apparatus 100 can be included in a continuous catalyst regeneration reforming unit 300, which can include the carbon monoxide removal zone 200, the reduction zone 310, a reforming reaction zone 320, and a regeneration zone 340. Although only one zone for each zone 200, 310, 320, and 340 is depicted, it should be understood that each zone 200, 310, 320, and 340 can each, independently, include one or more zones. A first lift 330 and a second lift 350 can communicate catalyst between, respectively, the zones 320 and 340 and the zones 310 and 340.

The carbon monoxide removal zone 200 can receive a reducing stream 204. The stream 204 can preferably include hydrogen, such as at least about 5%, by mole, preferably about 5-about 100%, by mole. In one preferred embodiment, the reducing stream 204 can be a hydrogen-containing stream 204. Desirably, the stream 204 can be rich in hydrogen. The stream 204 can also include C1-C5 hydrocarbons. Such streams can contain carbon monoxide at levels up to about 100 vppm, and typically about 5-about 20 vppm. Generally, the carbon monoxide levels in the stream rich in hydrogen can vary. Particularly, the carbon monoxide level may spike during, e.g., a unit upset. Consequently, the carbon monoxide removal zone 200 can be beneficial for removing the carbon monoxide, reducing or lowering the carbon monoxide amounts, and producing a stream with a consistently low amount of carbon monoxide. The product stream 208 from the carbon monoxide removal zone 200 can be no more than about 10 vppm, preferably no more than about 5 vppm, and optimally no more than about 1 vppm of carbon monoxide.

In one exemplary embodiment, the carbon monoxide removal zone 200 can include a modified clinoptilolite adsorbent. The modified clinoptilolite adsorbent can be ion-exchanged with a cation, such as a lithium, potassium, magnesium, calcium, sodium, or barium cation. The adsorption of carbon monoxide can be at a temperature no more than about 100° C., and preferably about −15°-about 100° C., and at a pressure of no more than about 150 kPa, preferably no more than about 100 kPa, and optimally no more than about 50 kPa. An exemplary process for removing carbon monoxide from a hydrogen stream using a modified clinoptilolite adsorbent is disclosed in US 2005/0137443 A1. Desirably, the adsorbent for removing carbon monoxide can be regenerated. However, the adsorbent can be disposable, i.e., not regenerable, in some exemplary embodiments.

Alternatively, the carbon monoxide removal zone 200 can include a methanation catalyst to remove carbon monoxide by reaction with hydrogen to form methane and water under methanation conditions. Generally, the methanation catalyst includes nickel, cobalt, or ruthenium, preferably nickel, and can be provided in any suitable manner, such as a packed bed, a fluidized bed, a coated heat exchanger tube, or a slurry catalyst mixture. Methanation conditions can include a temperature of about 200-about 400° C. and a pressure of about 600-about 4,500 kPa. Exemplary methanation processes are disclosed in, e.g., U.S. Pat. No. 3,970,435 and U.S. Pat. No. 6,379,645 B1.

The product stream 208 can be split. A first portion 230 can enter the lift 350 before the regenerated catalyst may enter the reduction zone 310. A second portion 240 can enter a heater 250 before entering the reduction zone 310.

The reduction zone 310 can receive regenerated catalyst from the regeneration zone 340 via a lift 350. Generally, the reduction zone 310 reduces metal, such as platinum, present on the regenerated catalyst in an atmosphere rich in a reducing gas, such as hydrogen. The reduction zone 310 can be at a temperature of about 140-about 700° C., preferably about 370-about 570° C., and a pressure of about 450-about 1,500 kPa. Generally, it is preferred to operate the reduction zone at about 550-about 700° C. Moreover, the reduction time can be from about 2-about 20 hours, preferably about 10-about 20 hours. Exemplary reduction zone conditions are disclosed in U.S. Pat. No. 6,881,391 B1. Also, the reduction zone can contain single or multiple sub-zones and flow configurations.

The reduction zone 310 can provide the reduced catalyst to the reforming reaction zone 320, which can include one or more reforming reactors. The reforming reaction zone 320 can communicate with the regeneration zone 340 via the first lift 330, which in turn can communicate with the reduction zone 310 via the second lift 350.

Particularly in the reforming reaction zone 320, a feedstock can be admixed with a stream including hydrogen and contacted with the reduced catalyst. The usual feedstock for catalytic reforming is a petroleum fraction known as naphtha and having an initial boiling point of about 80° C. and an end boiling point of about 205° C. The reactor inlet temperatures can range from about 450-about 560° C. The catalytic reforming process can be particularly applicable to the treatment of variously derived naphthas comprised of relatively large concentrations of naphthenic and substantially straight chain paraffinic hydrocarbons, which can be subject to aromatization through dehydrogenation and/or cyclization reactions. The naphthas can contain various amounts of aromatic components as well.

Reforming may be defined as the dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. An exemplary reforming process may be found in U.S. Pat. No. 4,409,095.

A catalytic reforming reaction is normally effected in the presence of catalyst particles having one or more Group VIII noble metals (e.g., platinum, iridium, rhodium, and palladium) and a halogen combined with a porous carrier, such as an alumina. Optionally, the catalyst may also contain a group IVA element, such as tin, and other catalytically effective components. An exemplary catalyst is disclosed in U.S. Pat. No. 6,034,018. The catalyst may pass through the reforming reaction zone 320 to the regeneration zone 340 via the lift 330. Exemplary reaction and regeneration zones 320 and 340 are disclosed in, e.g., U.S. Pat. No. 6,881,391 B1 and U.S. Pat. No. 6,034,018.

Figure 2:
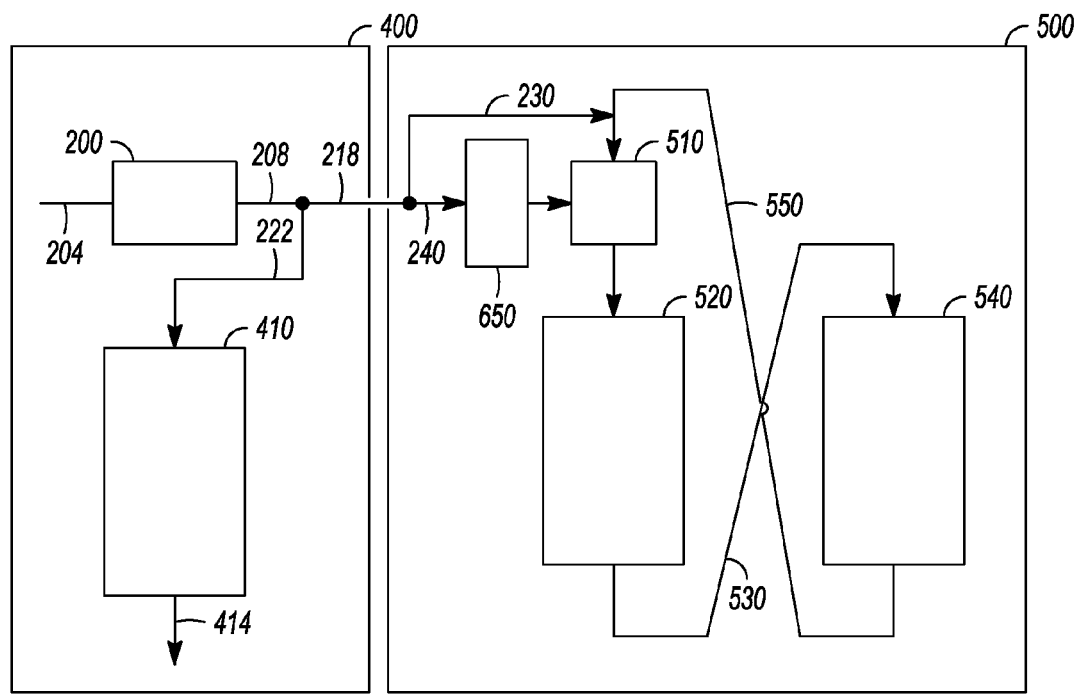
FIG. 2 is a schematic depiction of the exemplary apparatus for removing carbon monoxide within an exemplary paraffin isomerization unit in conjunction with an exemplary continuous catalytic regeneration reforming unit.

Alternatively, as depicted in FIG. 2, a carbon monoxide removal zone 200 can be in a second unit, such as a paraffin isomerization unit 400. An advantage of using an existing unit can be reducing capital expenditures. Typically the paraffin isomerization unit 400 can include an isomerization reaction zone 410 producing a product stream 414. The isomerization reaction zone 410 can isomerize any suitable paraffin hydrocarbon, such as at least one of a C4-C6 hydrocarbon, such as an exemplary zone disclosed in, e.g., Nelson A. Cusher, *UOP Butamer Process and UOP Penex Process* of the Handbook of Petroleum Refining Processes, Third Edition, Robert A. Meyers, Editor, 2004, pp. 9.7-9.27. Although a paraffin isomerization unit 400 has been disclosed, it should be understood that any suitable unit can include the carbon monoxide removal zone 200.

Generally, the reducing stream 204 passes through the carbon monoxide removal zone 200, as described above. The resulting product stream 208 can include a first part 218, and a second part 222. The first part 218 can be routed to a continuous catalyst regeneration reforming unit 500, and the second part 222 can be routed to the isomerization reaction zone 410.

The continuous catalyst regeneration reforming unit 500 can include a reduction zone 510, a reforming reaction zone 520, a first lift 530, a regeneration zone 540, a second lift 550, and a heater 650. The first part 218 can be split into the first portion 230 and the second portion 240. The first portion 230 can be routed to the lift 550, and the second portion 240 can be routed to the heater 650 before entering the reduction zone 510, similarly as described above for the unit 300. The reduction zone 510, the reforming reaction zone 520, the first lift 530, the regeneration zone 540, and the second lift 550 can operate and communicate as the reduction zone 310, the reforming reaction zone 320, the first lift 330, the regeneration zone 340, and the second lift 350, as described above.

ILLUSTRATIVE EMBODIMENTS

The following examples are intended to further illustrate the subject embodiments. These illustrations of embodiments of the invention are not meant to limit the claims of this invention to the particular details of these examples. These examples are based on engineering calculations and actual operating experience with similar processes.

Example 1

Two catalysts are prepared with a spherical alumina support. The first catalyst has a final composition of 0.25%, by weight, platinum (Pt) and 0.30%, by weight, tin (Sn) (catalyst A) while a second catalyst has a final composition of 0.30%, by weight, Pt and 0.30%, by weight, Sn (catalyst B). Each catalyst is oxychlorinated to disperse the platinum and achieve a chloride level of about 0.9-about 1%, by weight, chloride (Cl) on the catalyst.

Each catalyst is then exposed to different reduction conditions in a reforming pilot plant using naphtha feed of 55.5% paraffins, 31.7% naphthenes, and 12.8% aromatics (all percents by weight) at a hydrogen:hydrocarbon mole ratio of 2, a liquid hourly space velocity (LHSV) of 1.7 $hr^{-1}$, and a pressure of 620 kPa. Catalyst activity is determined by the temperature needed to maintain a target octane. Yields are calculated based on on-line gas and liquid effluent chromatography analysis. Runs are equal in length of time and spent catalyst is dumped in separate beds after each run. A sample from each bed is submitted for a carbon burn and the results are weight-averaged to calculate the average carbon. Results are depicted in Table 1.

TABLE 1

Yield and Activity Results of 56 $m^3$ of Naphtha Feed Per $m^3$ of Catalyst

| | | H2 Reduction Conditions | | | | Pilot Plant Results | | |
| | | | | | | Activity | Average | |
| Catalyst | Cl (wt. %) | Time (hour) | Temp. (° C.) | CO (vppm) | $C5^+$ (wt. %) | Temp (° C.) | Carbon (g/100 cc) | Delta % |
|---|---|---|---|---|---|---|---|---|
| A | 0.98 | 4 | 565 | 10 | 86.6 | 517 | 1.74 | Base |
| A | 0.94 | 2 | 565 | 0 | 86.3 | 516 | 1.42 | −18.4% |
| B | 0.99 | 4 | 565 | 10 | 86.8 | 518 | 2.15 | Base |
| B | 0.95 | 2 | 565 | 0 | 86.5 | 517 | 1.77 | −17.7% |

TABLE Abbreviations:
temperature: Temp.
gram: g
chloride weight percent: Cl wt. %
centimeter cubed: cc As depicted above, a run having 0 vppm of CO in the reducing gas decreases coking by about 18% for both catalysts A and B. The $C5^+$ yields and activity remain relatively constant.

Example 2

Similar experiments are conducted as in Example 1 using a commercially manufactured continuous catalyst regeneration catalyst (catalyst C) containing 0.25% Pt, 0.3% Sn, and 0.94% Cl (all percentages by weight). Catalyst C is split into two portions for reduction at temperatures of 399° C. and 566° C. in the presence of 0 vppm carbon monoxide. Results are depicted in Table 2.

TABLE 2

Yield and Activity Results of 56 m³ of Naphtha Feed Per m³ of Catalyst

| | | | | | Pilot Plant Results | | | |
|---|---|---|---|---|---|---|---|---|
| | | H2 Reduction Conditions | | | Activity | Average | | |
| Catalyst | Cl (wt. %) | Time (hour) | Temp. (° C.) | CO (vppm) | C5+ (wt. %) | Temp. (° C.) | Carbon (g/100 cc) | Delta % |
| C | 0.90 | 2 | 399 | 0 | 86.2 | 519 | 2.44 | Base |
| C | 0.78 | 2 | 566 | 0 | 86.3 | 519 | 2.03 | −16.8% |

Results indicate that higher reduction temperatures produce about 17% less coke for catalyst C. The C5+ yields and activity remain relatively constant.

Example 3

Further experiments with catalyst A and B are conducted for up to 10 hours, in the presence of 0 vppm of carbon monoxide with samples analyzed at 2, 4 and 10 hours. The data at 4 hours is from Table 1. Results are depicted in Table 3.

TABLE 3

Yield and Activity Results of 56 m³ of Naphtha Feed Per m³ of Catalyst

| | | | | | Pilot Plant Results | | | |
|---|---|---|---|---|---|---|---|---|
| | | H2 Reduction Conditions | | | Activity | Average | | |
| Catalyst | Cl (wt. %) | Time (hour) | Temp. (° C.) | CO (vppm) | C5+ (wt. %) | Temp. (° C.) | Carbon (g/100 cc) | Delta % |
| A | 0.98 | 4 | 565 | 10 | 86.6 | 517 | 1.74 | Base |
| A | 0.94 | 2 | 565 | 0 | 86.3 | 516 | 1.42 | −18.4% |
| A | 0.87 | 10 | 565 | 0 | 86.1 | 518 | 1.34 | −23.0% |
| B | 0.99 | 4 | 565 | 10 | 86.8 | 518 | 2.15 | Base |
| B | 0.95 | 2 | 565 | 0 | 86.5 | 517 | 1.77 | −17.7% |
| B | 0.87 | 10 | 565 | 0 | 86.8 | 518 | 1.56 | −27.4% |

As depicted, extended reduction time in substantially carbon monoxide free hydrogen gas results in further coke reduction ranging from about 23-about 27% reduction, as compared to the base condition of 4 hours, as depicted in Table 1.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A continuous catalyst regeneration and reduction process, comprising:

A) passing a reducing stream comprising at least about 5%, by mole, hydrogen through a carbon monoxide removal zone to produce a product stream comprising no more than about 10 vppm carbon monoxide;

B) communicating the product stream to a reduction zone continuously receiving a regenerated catalyst comprising unreduced metal species from a continuous catalyst regeneration zone, C) reducing, using at least a portion of the product stream, the unreduced metal species on the regenerated catalyst in the reduction zone to generate a reduced and regenerated catalyst; and D) passing the reduced and regenerated catalyst from the reduction zone to a reforming reaction zone.

2. The process according to claim 1, wherein the product stream comprises no more than about 1 vppm carbon monoxide.

3. The process according to claim 1, wherein reducing in the reduction zone is conducted at about 550-about 700° C.

4. The process according to claim 1, wherein a first portion of the product stream communicates with the reduction zone, and a second portion communicates with a heater before entering the reduction zone.

5. The process according to claim 1, wherein the carbon monoxide removal zone is located in a second unit.

6. The process according to claim 5, wherein the second unit comprises a paraffin isomerization unit comprising an isomerization reaction zone; and the product stream comprises a first part and a second part; wherein the first part communicates with the reduction zone and the second part communicates with the isomerization reaction zone.

7. The process according to claim 1, wherein the carbon monoxide removal zone comprises a clinoptilolite adsorption zone.

8. The process according to claim 7, wherein the clinoptilolite adsorption zone comprises an ion-exchanged clinoptilolite zeolite and has a temperature of about −15-about 100° C. and a pressure of no more than about 150 kPa.

9. The process according to claim 1, wherein the carbon monoxide removal zone comprises a methanation zone.

10. The process according to claim 9, wherein the methanation zone comprises a catalyst, in turn, comprising nickel, cobalt, or ruthenium, and has a temperature of about 200-about 400° C. and about 600-about 4,500 kPa.

* * * * *